Feb. 18, 1964 L. E. HOLLANDER, JR 3,121,337
PIEZORESISTIVE TRANSDUCER EMPLOYING OXYGEN-DEFICIENT
RUTILE AS THE PIEZORESISTIVE MATERIAL
Filed Nov. 24, 1959 3 Sheets-Sheet 1

INVENTOR.
LEWIS E. HOLLANDER, JR.
BY
Agent

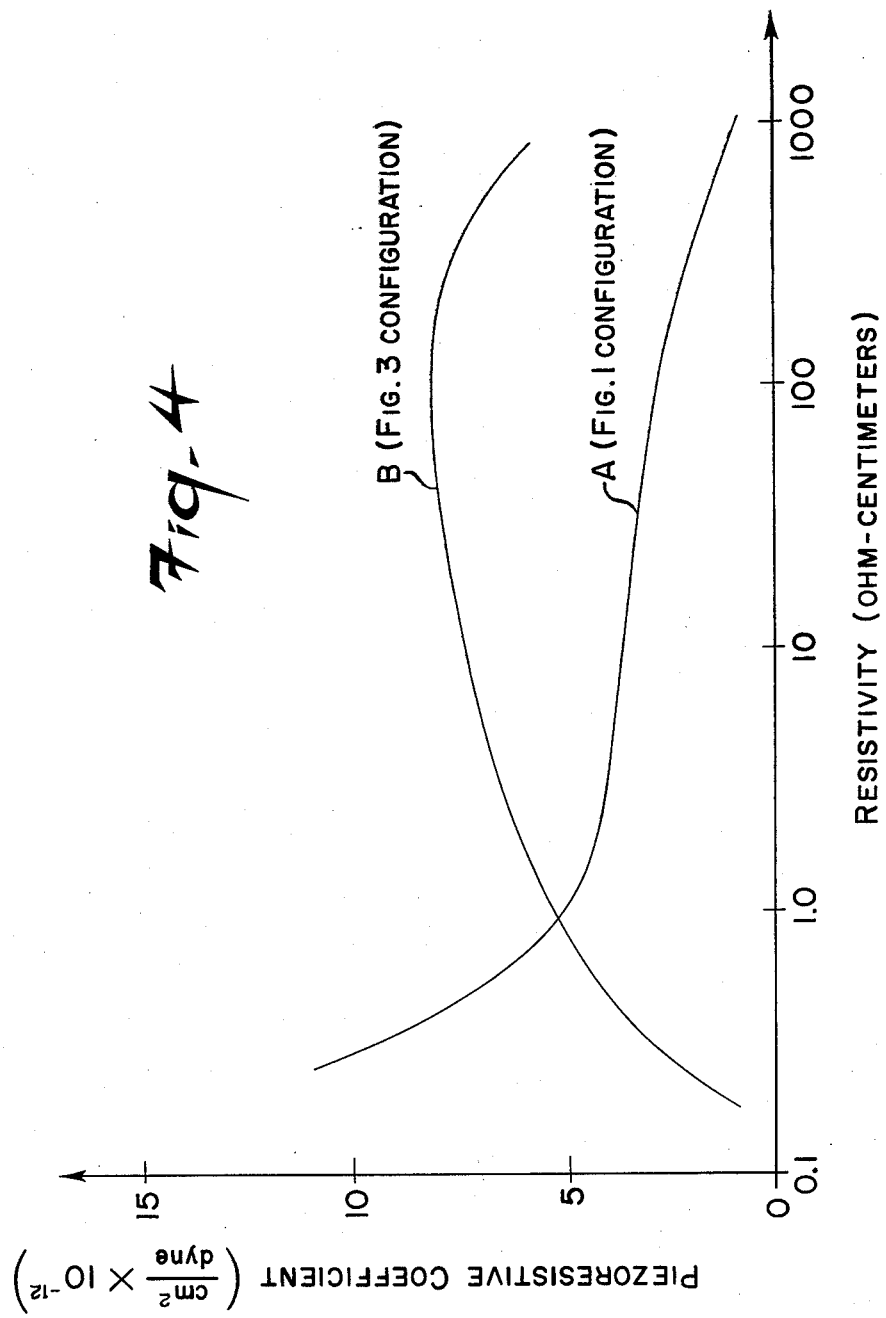

Feb. 18, 1964 L. E. HOLLANDER, JR 3,121,337
PIEZORESISTIVE TRANSDUCER EMPLOYING OXYGEN-DEFICIENT
RUTILE AS THE PIEZORESISTIVE MATERIAL
Filed Nov. 24, 1959 3 Sheets-Sheet 3

INVENTOR.
LEWIS E. HOLLANDER, JR.
BY
George C. Sullivan
Agent

| United States Patent Office | 3,121,337 |
|---|---|
| | Patented Feb. 18, 1964 |

3,121,337
PIEZORESISTIVE TRANSDUCER EMPLOYING OXYGEN-DEFICIENT RUTILE AS THE PIEZORESISTIVE MATERIAL
Lewis E. Hollander, Jr., Los Altos Hills, Calif., assignor to Lockheed Aircraft Corporation, Burbank, Calif.
Filed Nov. 24, 1959, Ser. No. 855,042
7 Claims. (Cl. 73—517)

This invention generally relates to piezoresistive transducers, and more particularly to a piezoresistive transducer employing oxygen-deficient rutile as the piezoresistive material.

The piezoresistive effect, which has been discovered in a few semiconductors, appears as a change in the resistivity of the material in response to an applied stress, which is independent of any contribution from dimensional changes. In certain semiconductors, such as silicon and germanium, this piezoresistive effect has been discovered to be quite appreciable and has been extensively studied. Also, a significant piezoresistive effect has been discovered in indium antimonide. The existence of appreciable piezoresistive effects in these materials has led to the possibility that the piezoresistive effect may advantageously be employed to make a new type of transducer in which applied stress will be detected by resistance measurements, rather than by a generated voltage as in the conventional piezoelectric transducer. As will be understood by those skilled in the art, the detection of stress by measuring changes in resistivity offers important advantages in some applications over piezoelectric detection techniques. However, piezoresistive transducers using the above three semiconductors in which a useable piezoresistive effect has been observed have not been found satisfactory, because these materials are structurally weak, very temperature sensitive, and are subject to drift, instability and noise.

As far as is now known a useable piezoresistive effect has only been discovered in the above three semiconductors which are cubic crystals having high carrier mobility. The piezoresistive effect is such that it is not possible to predict which materials will exhibit a useable piezoresistive effect. As a result of a number of experiments I have performed, however, I unexpectedly discovered that the piezoresistive effect is quite appreciable in oxygen-deficient rutile, even though this material is entirely unrelated to germanium, silicon or indium antimonide in which appreciable piezoresistive effects have already been observed. While these latter materials have a higher carrier mobility and possess a cubic symmetry, rutile on the other hand, has a very low carrier mobility and possesses a tetragonal symmetry. Also, as compared to germanium, silicon or indium antimonide, rutile is very stable, is relatively insensitive to temperature changes and has a very high yield strength. Because of these highly superior properties of rutile, it now becomes possible to provide a practical piezoresistive transducer whose structural characteristics and stability compare favorably with known piezoelectric and other types of transducers, thereby making available the use of the desirable features of piezoresistive transducers for a great variety of important applications.

Accordingly, it is the broad object of this invention to provide a greatly improved piezoresistive transducer.

A more specific object of this invention is to provide an improved piezoresistive transducer using oxygen-deficient rutile as the piezoresistive material.

An additional object of this invention is to provide an improved method for making a piezoresistive transducer in which oxygen-deficient rutile is the piezoresistive material.

A further object of this invention is to provide an improved piezoresistive accelerometer.

The specific nature of the invention, as well as other objects, uses and advantages thereof, will clearly appear from the following description and from the accompanying drawing in which:

FIGURE 4 is a graph showing the variation of the piezoresistive coefficient with resistivity for the configurations of FIGURES 1 and 3.

Rutile is one of three crystal modifications of titanium dioxide, $TiO_2$, the electrical properties of which are dependent on the amount of oxygen deficiency in the $TiO_2$ crystal lattice. For example, rutile may be varied from a good insulator ($10^{13}$ ohm-centimeters) in the stoichiometric state to a conductor (0.1 ohm-centimeter) by varying the oxygen deficiency in the crystal lattice. The rutile crystal structure is tetragonal, with $a=4.4923$ angstroms, $c=2.8930$ angstroms and the Schonflies symmetry $D_{4h}$. The symbols "$a$" and "$c$" are orientation axes of the crystal and, similar to the symmetry symbol "$D_{4h}$," will readily be understood by those skilled in the art.

The decomposition or reduction of rutile and the resultant semiconductive properties thereof have already been investigated in the art and are well-known. Also, rutile has been advantageously used in electric current rectifiers, and also, as the dielectric for capacitors (see Patent Nos. 2,692,212; 2,695,380 and 2,272,330).

I have discovered another important and most unexpected use for rutile as the piezoresistive material of a piezoresistive transducer. As was brought out previously, the amount of oxygen deficiency in rutile determines its resistivity, the greater the oxygen deficiency the lower the resistivity. It has been found that rutile can advantageously be employed for transducer applications throughout the range of oxygen deficiencies for which the resistivity of the material is in the range that the term "semiconductor" is conventionally employed. Of course, some resistivities and some configurations will be more advantageous than others, and these will be exemplified herein. The rutile material suitable for transducer applications will therefore be referred to as a "semiconductor." Also, since a significant oxygen deficiency is necessary in order to bring rutile to the semiconductor state, the piezoresistive material of this invention will be referred to as oxygen-deficient rutile.

Figure 1:
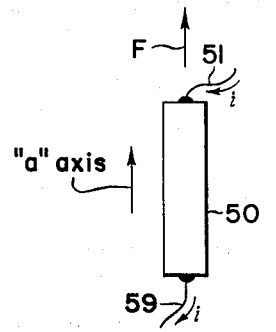
FIGURES 1–3 are schematic diagrams illustrating three advantageous configurations for a piezoresistive transducer employing oxygen-deficient rutile as the piezoresistive material.
Figure 2:
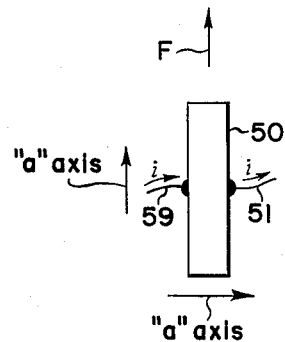
Figure 3:
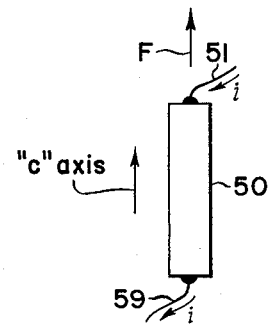

Three advantageous transducer configurations employing single crystal, oxygen-deficient rutile which have been found to exhibit large piezoresistive effects are illustrated in FIGURES 1–3. Although these configurations have been found to be most preferable, the presentation thereof is not to be considered as limiting the scope of the present invention. In FIGURES 1–3, longitudinal semiconductor pieces 50 of single crystal, oxygen-deficient rutile have electrical lead wires 51 and 59 soldered at opposite portions thereof. The arrow designated by F indicates the direction of applied stress, while the other arrows in the configurations designate the orientation of the crystal and the direction of current flow therethrough.

In FIGURE 1, the "a" crystal axis, the direction of the applied stress indicated by the arrow F and the flow of current i through the crystal are all in the same direction parallel to the longitudinal axis of the crystal 50. In FIGURE 2, on the other hand, while the applied stress F is parallel to the longitudinal axis, the flow of current i through the crystal 50 is in a direction at right angles to the longitudinal axis of the crystal 50, and the crystal 50 is oriented with "a" axes in directions both parallel and perpendicular to the longitudinal axis. In FIGURE 3, the configuration is the same as that of FIGURE 1 except that the crystal slab 50 is oriented with its "c" crystal axis parallel to the longitudinal axis. Where axes are not indicated in FIGURES 1–3, the particular orientation of the crystal structure in that direction is not important.

In the configurations of FIGURES 1 and 2, the greatest piezoresistive effect is obtained when the resistivity of the oxygen-deficient single crystal rutile is relatively low of the order of 0.1 ohm-centimeter. For the FIGURE 3 configuration, on the other hand, the greatest piezoresistive effect is obtained when the resistivity is relatively high, e.g., of the order of 100 ohm-centimeters. The variation of the piezoresistive coefficient with resistivity for the configurations of FIGURES 1 and 3 are shown by the curves A and B, respectively, in FIGURE 4 over the range of resistivities from 0.1 to 1,000 ohm-centimeters. It is to be understood that other configurations than those shown in FIGURES 1–3 are possible and although they exhibit a somewhat smaller piezoresistive effect, they may be more suitable in certain applications.

Also, it is not essential that single crystal oxygen-deficient rutile be used. Although the use of single crystal material results in a larger piezoresistive effect, a lower, but still useable, effect is obtained with oxygen-deficient rutile in ceramic form.

The semiconductor pieces 50 of single crystal, oxygen-deficient rutile shown in FIGURES 1–3 were obtained by cutting single crystals approximately 2 x 2 x 15 millimeters from X-ray oriented boules of stoichiometric rutile. These crystal samples were reduced or oxidized in a quartz-tube oven by circulating either hydrogen or air at various temperatures from 450° to 1100° centigrade for various time intervals. Care was taken to assure a uniform resistivity distribution by heating the crystals in a vacuum, subsequent to their reduction.

Considerable difficulty was encountered in securing good ohmic contacts between the electrical wire leads 51 and 59 and the reduced semiconductor pieces 50. In order to overcome this difficulty, a method was devised for soldering the electrical wire leads to the semiconductor pieces. The reduced pieces of single crystal, oxygen-deficient rutile were first cleaned in a solution of $H_2SO_4$ and $K_2Cr_2O_7$. Ohmic contacts were then formed at the desired places on the semiconductor pieces 50 by soldering with pure, clean indium metal to which electrical leads 51 and 59 suitably soldered. These ohmic contacts were found to be very low in resistance and non-rectifying. A very low ohmic contact resistance is of extreme importance where the resistivity of the crystal slab 50 is relatively small as is the preferred case for the configurations of FIGURES 1 and 2.

Figure 5:
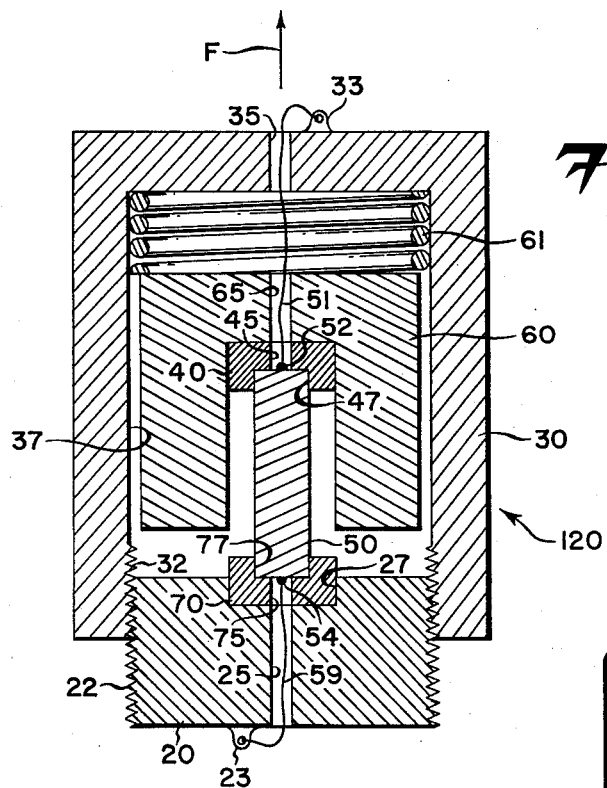
FIGURE 5 is a longitudinal cross-sectional view of an embodiment of a piezoresistive accelerometer employing oxygen-deficient rutile as the piezoresistive material, in accordance with the invention.

FIGURE 5 is a longitudinal cross-sectional view illustrating an embodiment of a piezoresistive accelerometer 120 which may be employed with the configurations of FIGURES 1 and 2, in accordance with the invention. In FIGURE 5, the numeral 50 again designates the crystal 50 and the numerals 51 and 59 designate the electrical lead wires connected at opposite ends thereof. Indium ohmic contacts provided as described above are designated by the numerals 52 and 54.

Figure 6:
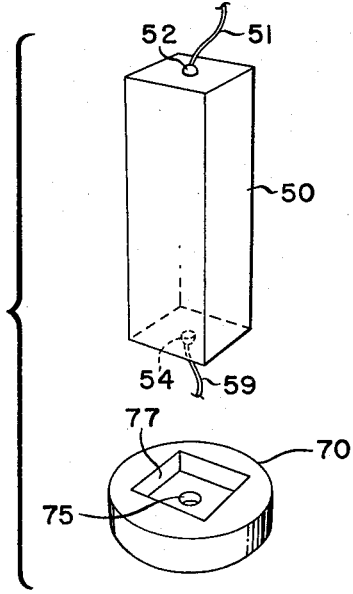
FIGURE 6 is an exploded perspective view of a portion of FIGURE 5 showing the piezoresistive material and its lower supporting member.

Cylindrical metal supporting members 40 and 70 have square recesses 47 and 77, respectively, adapted to receive and support the square cross-sectional ends of the crystal 50. FIGURE 6 illustrates the crystal 50 and its lower support member 70. The upper support member 40 is substantially the same. A cylindrical load mass 60 has a bore 67 adapted to snugly receive the cylindrical metal supporting member 40 at its base, the bore 67 being sufficiently long so that the mass 60 surrounds the crystal 50 for almost its full length. The mass 60 is urged against the upper supporting member 40 by the action of a compressed spring 61 which is compressed in a space between a cup-shaped cylindrical base structure 30 and the load mass 60. The cup-shaped base structure 30 has a bore 37 which is internally threaded for a relatively short distance extending from the open end of the cup as shown at 32.

A cylindrical metal member 20 having an external thread 22 is adapted to be screwed into the cup-shaped base structure 30 as shown. The member 20 has a cylindrical bore 27 which receives the cylindrical surface of the supporting member 70 in such a way that the member 20 may be screwed into the cup-shaped base structure 30, to compress the spring 61 and apply an initial compression to the crystal 50, without applying any detrimental torsional forces to the crystal 50. As the member 20 turns, therefore, the interior of its bore 27 slides around the cylindrical exterior of the supporting member 70 which remains fixed. Any desired initial compression can thus be applied to the crystal slab 50 by screwing in the member 20 to the desired depth. Of course, the spring system is adjusted so that its natural frequency is out of the range of frequencies of the acceleration to be measured.

Holes 45, 65 and 35 in the members 40, 60 and 30, respectively, permit the electrical lead wire 51 to be brought out to a suitable terminal 33 which is provided integral with the base structure 30. Likewise, holes 75 and 25 in the members 70 and 20, respectively, permit the electrical lead wire 59 to be brought out to a suitable terminal 23 provided integral with the member 20. Electrical leads may now be connected to these terminals 23 and 33 in order to connect the accelerometer 120 in a suitable electrical circuit.

The piezoresistive accelerometer 120 of FIGURE 5 may now be explained as follows. The accelerometer 120 is suitably mounted so that its longitudinal axis is in the direction of the acceleration to be measured. The metal member 20 is screwed into the cup-shaped base structure 30 so that a desired initial compression is applied to the crystal 50. Acceleration in the direction of the arrow F will then act on the load mass 60 so as to stress the crystal in accordance with the applied acceleration, thereby causing corresponding changes in the electrical resistance between the terminals 23 and 33.

Figure 7:
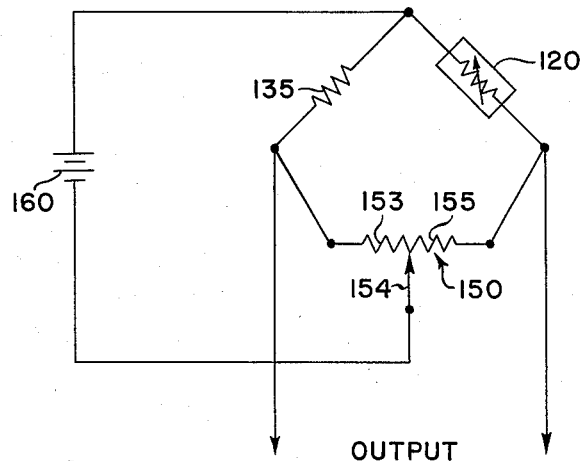
FIGURE 7 is an electrical circuit diagram of a bridge circuit in which the accelerometer of FIGURE 5 is employed to detect changes in the resistance of the transducer in response to acceleration applied thereto.

FIGURE 7 illustrates an electrical bridge circuit which may be employed in cooperation with the accelerometer 120 for obtaining a signal proportional to the applied acceleration. In FIGURE 7, the transducer 120 is connected as one arm of a conventional type of bridge circuit. A reference resistor 135 serves as an adjacent arm of the bridge, and the two halves 153 and 155 of a potentiometer 150 serve as the other two resistive arms of the bridge. A D.-C. battery 160 is connected between the junction of the standard resistor 135 and the transducer 120, and the variable arm 154 of the potentiometer 120. The output signal is then obtained between the junction of the reference resistor 135 and the potentiometer resistance 153, and the junction between the accelerometer 120 and the potentiometer resistance 155, as shown in FIGURE 7. With no acceleration applied to the transducer 120, the variable arm 154 of the potentiometer 150 is adjusted so that there is no output signal from the bridge circuit. In the presence of acceleration, longitudinal stress will be applied to the crystal 50 causing a corresponding change in the effective resistance of the accelerometer 120, thereby unbalancing the bridge and producing an output signal proportional to the applied acceleration.

It is important to realize in connection with the present invention that the particular accelerometer construction illustrated in FIGURE 5 and the electrical bridge detection circuit of FIGURE 7 may be modified in a variety of ways which will be apparent to those skilled in the art. Such modifications are considered to be within the scope of the present invention, the heart of the invention residing in the discovery that oxygen-deficient rutile, which is a very much more desirable structural material for transducer applications, exhibits an appreciable piezoresistive effect, even though it is unrelated to known semiconductors in which an appreciable piezoresistive effect has heretofore been observed.

It will be apparent, therefore, that the embodiments shown in the drawing are only exemplary, and that various modifications can be made in construction and arrangement within the scope of the invention as defined in the appended claims.

I claim as my invention:

1. A piezoresistive transducer comprising a piece of semiconductor material of single crystal oxygen-deficient rutile, said piece of material having a longitudinal axis, and means attached to said piece of material for passing a current through opposite portions thereof, said piece of material being constructed and arranged so that the "$a$" crystal axis of said piece of material, the flow of current therethrough, and the stress applied thereto are all in a direction parallel to said longitudinal axis.

2. A piezoresistive transducer comprising a piece of semiconductor material of single crystal oxygen-deficient rutile, and means attached to said piece of semiconductor material for passing a current through opposite portions thereof, said piece of semiconductor material being constructed and arranged so that the "$c$" crystal axis of said piece of material, the flow of current therethrough and the stress applied thereto are all in a direction parallel to said longitudinal axis.

3. A piezoresistive transducer comprising a piece of semiconductor material of single crystal oxygen-deficient rutile, said piece of material having a longitudinal axis, and means attached to said piece of material for passing current through opposite portions thereof, said piece of material being constructed and arranged so that an "$a$" crystal axis and the stress applied to said piece of material is parallel to the longitudinal axis thereof, an "$a$" crystal axis is perpendicular to said longitudinal axis, and the flow of current through said piece of material is parallel to the "$a$" crystal axis which is perpendicular to said longitudinal axis.

4. A transducer system comprising a piece of semiconductor material of oxygen-deficient rutile, said piece of material having a longitudinal axis, means attached to said piece of semiconductor material for passing a current through opposite portions thereof, said piece of material being constructed and arranged so that the "$a$" crystal axis of said piece of material, the flow of current therethrough, and the stress applied thereto are all in a direction parallel to said longitudinal axis, means mounting said piece of material for transducer operation, and bridge circuit means cooperating with the means for passing a current through said piece of material for detecting variations in the resistivity of said material in response to stress applied thereto.

5. A piezoresistive accelerometer comprising a piece of semiconductor material of oxygen-deficient rutile, said piece of material having a longitudinal axis, means attached to said piece of material for passing a current through opposite portions thereof, said piece of material being constructed and arranged so that the "$a$" crystal axis of said piece of material, the flow of current therethrough, and the stress applied thereto are all in a direction parallel to said longitudinal axis, means supporting said piece of material, and a load mass adapted to change the stress on said piece of semiconductor material in response to acceleration applied to said accelerometer.

6. An improved piezoresistive transducer comprising a piece of single crystal oxygen-deficient rutile material having a longitudinal axis and a resistivity on the order of 0.1 ohm-centimeter when a current flow therethrough and a stress applied thereto are in a direction of the "$a$" crystal axis of said piece of rutile which is parallel to said longitudinal axis.

7. An improved piezoresistive transducer comprising a piece of single crystal oxygen-deficient rutile material having a longitudinal axis and a resistivity on the order of 1000 ohm-centimeters when a current flow therethrough, and a stress applied thereto are in the direction of the "$c$" axis of said piece of rutile which is parallel to said longitudinal axis.

References Cited in the file of this patent

UNITED STATES PATENTS

| | | |
|---|---|---|
| 1,675,117 | Lubowsky | June 26, 1928 |
| 2,486,187 | Mason | Oct. 25, 1949 |
| 2,493,144 | Jaffe | Jan. 3, 1950 |
| 2,504,368 | Wooster et al. | Apr. 18, 1950 |
| 2,505,121 | Knights | Apr. 25, 1950 |
| 2,657,352 | Sink | Oct. 27, 1953 |
| 2,726,074 | Ketchledge | Dec. 6, 1955 |
| 2,792,287 | Moore et al. | May 14, 1957 |
| 2,815,480 | Ruge | Dec. 3, 1957 |
| 2,886,682 | Martin | May 12, 1959 |
| 2,963,911 | Pratt | Dec. 13, 1960 |
| 2,974,203 | Flaschen | Mar. 7, 1961 |